Patented Nov. 10, 1931

1,831,538

UNITED STATES PATENT OFFICE

JOHN McGAVACK, OF JACKSON HEIGHTS, NEW YORK, ASSIGNOR TO THE NAUGATUCK CHEMICAL COMPANY, OF NAUGATUCK, CONNECTICUT, A CORPORATION OF CONNECTICUT

MOLDING COMPOSITION

No Drawing.     Application filed June 6, 1929.  Serial No. 369,008.

This invention relates to a molding composition including a new and useful binder for the finely divided molding material such as sand, and more particularly to a composition which may be used for making sand cores in foundries.

Heretofore it has been the practice to mix with the sand or other finely divided material some sticky or viscous material to hold the particles together so that when molded the sand or other finely divided material retains its shape previous to as well as after baking, burning or other preparatory operation preliminary to the casting of metal.

The present invention aims to provide an improved composition having a binder easier to work in connection with the manipulation of the sand or other finely divided material, relatively inexpensive, and which will yield a sand core having a smoother surface than is obtainable with binders heretofore used.

It has been discovered that if rubber latex (which has been preserved with a small percentage of ammonia or equivalent preservative) is subjected to one or more creaming operations according to the British patent to Traube No. 226,440, May 29, 1924, the serum that may be removed or separated from the top layer of rubber particles has properties which make it a satisfactory binder for sand or other finely divided material in foundries. While the serum separated from rubber latex in the manner disclosed in the above mentioned British patent to Traube may vary somewhat, it ordinarily comprises 7% by weight of solids and 93% of water. These solids include the following substances in the following approximate proportions by weight:

| | |
|---|---|
| Quebrachitol | 02.45 |
| Proteins | 02.24 |
| Rubber | 00.84 |
| Soap | 00.77 |
| Mineral salts | 00.63 |
| Miscellaneous ingredients | 00.07 |
| Total solids | 7.00 |

If a serum from rubber latex of the above character is concentrated by direct heat, evaporation, or otherwise as convenient to bring its solid content up to about 25%, it may be used with marked advantage for binding sand or other finely divided materials. As such serum heretofore has been a total loss, it will be appreciated that the invention will enable substantial savings to be effected.

When sand or other finely divided material used in foundry practice is treated with the serum of the present invention, it may not only be molded with facility into the desired shape, and where necessary, baked or otherwise treated preparatory to casting, but also after the metal has been cast and the casting cooled down, the sand is exceedingly friable so that its removal from the casting, regardless of what intricate shapes it may take, may be effected with facility. There is no lumping or balling up of the particles of the sand which heretofore has been an objection more or less serious in many cases.

While it is preferred to obtain a serum from rubber latex by one or more treatments with a creaming agent, as disclosed in the British patent to Traube, the serum may be obtained by any process including the old and well known acid coagulation practice in which case, of course, it will contain a percentage of the coagulant employed together with the ingredients above named in slightly different proportions.

Having thus described my invention, what I claim and desire to protect by Letters Patent is:

1. A molding composition comprising finely divided mold-forming material and serum from latex.

2. A molding composition comprising molding sand and rubber latex serum substantially free of rubber.

3. A molding composition comprising molding sand and concentrated serum from rubber latex.

Signed at Passaic, county of Passaic, State of New Jersey, this 31st day of May, 1929.

JOHN McGAVACK.